(12) United States Patent
Molina, Sr. et al.

(10) Patent No.: US 9,642,375 B2
(45) Date of Patent: May 9, 2017

(54) COMPOSITION AND METHOD TO PREPARE AN EDIBLE FOOD PRODUCT

(76) Inventors: Rudy Molina, Sr., Tucson, AZ (US);
Rudy Molina, Jr., Tucson, AZ (US)

(*) Notice: Subject to any disclaimer, the term of this patent is extended or adjusted under 35 U.S.C. 154(b) by 0 days.

(21) Appl. No.: 12/635,635

(22) Filed: Dec. 10, 2009

(65) Prior Publication Data

US 2010/0209554 A1     Aug. 19, 2010

Related U.S. Application Data

(60) Provisional application No. 61/121,441, filed on Dec. 10, 2008.

(51) Int. Cl.
*A21D 13/00* (2006.01)

(52) U.S. Cl.
CPC .................. *A21D 13/0096* (2013.01)

(58) Field of Classification Search
CPC ........................ A21D 13/00; A21D 13/0048
USPC ..................... 426/496, 549, 61, 62
See application file for complete search history.

(56) References Cited

U.S. PATENT DOCUMENTS

| | | | |
|---|---|---|---|
| 4,244,980 A | | 1/1981 | Fischer et al. |
| 4,500,548 A | * | 2/1985 | Silva ............................. 426/19 |
| 7,182,969 B2 | * | 2/2007 | Goodmanson ................. 426/549 |
| 8,287,930 B2 | * | 10/2012 | Elmusa et al. ................... 426/72 |
| 2004/0241303 A1 | | 12/2004 | Levin et al. |
| 2005/0153016 A1 | | 7/2005 | Domingues et al. |

OTHER PUBLICATIONS

International Search Report and Written Opinion dated Mar. 2, 2010.

* cited by examiner

*Primary Examiner* — Lien T Tran
(74) *Attorney, Agent, or Firm* — Jiarong L. Lamiquiz; Quarles & Brady LLP

(57) ABSTRACT

A method to prepare donuts, wherein the method prepares a first batch of donut dough, allows that first batch of donut dough to age for at least 24 hours to prepare fermented dough, prepares a second batch of donut dough, mixes 5 pounds of the fermented dough with a gallon of the second batch of donut dough, cuts donuts from the fermented dough/second batch of donut dough mixture, and fries the donuts.

18 Claims, 2 Drawing Sheets

COMPOSITION AND METHOD TO PREPARE AN EDIBLE FOOD PRODUCT

CROSS REFERENCE TO RELATED APPLICATIONS

This Application claims priority from a U.S. Provisional Application having Ser. No. 61/121,441, which was filed on Dec. 10, 2008, and which is hereby incorporated herein by reference.

FIELD OF THE INVENTION

The invention relates to a composition and method to prepare an edible food product. In certain embodiments, the invention relates to a composition and method to prepare donuts.

BACKGROUND OF THE INVENTION

Prior art methods to prepare donuts prepare a donut composition, and immediately thereafter cut the donuts and then fry the donuts.

SUMMARY OF THE INVENTION

A method to prepare donuts is presented. The method prepares a first batch of donut dough, allows that first batch of donut dough to age for at least 24 hours to prepare fermented dough, prepares a second batch of donut dough, mixes 5 pounds of the fermented dough with a gallon of the second batch of donut dough, cuts donuts from the fermented dough/second batch of donut dough mixture, and fries the donuts.

An edible food product is presented. The edible food product is formed using a process which prepares a first batch of donut dough, allows that first batch of donut dough to age for at least 24 hours to prepare fermented dough, prepares a second batch of donut dough, mixes 5 pounds of the fermented dough with a gallon of the second batch of donut dough, cuts donuts from the fermented dough/second batch of donut dough mixture, and fries the donuts.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
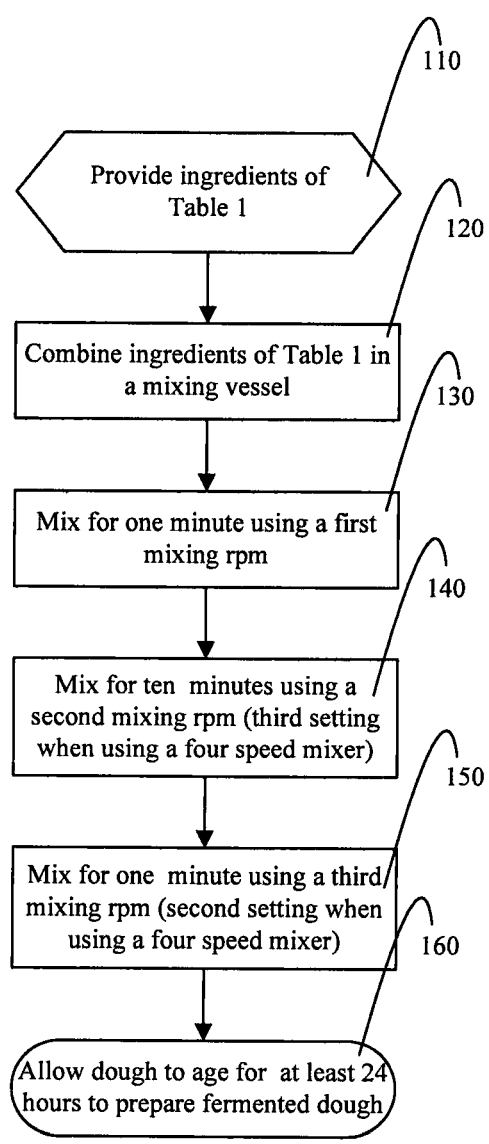
FIG. 1 is a flow chart summarizing the steps of Applicants' method to prepare fermented dough.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicant's invention comprises a doughnut composition, and method using that composition, to prepare doughnuts. Table 1 summarizes the ingredients comprising Applicant's composition. Applicant's composition comprises no animal fat or animal fat-derived materials. Furthermore, in certain embodiments Applicant's composition comprises no butter, no milk products, and no eggs. Rather, Applicant's composition has long been referred to as a "vegetable" formulation. Applicant's composition includes vegetable shortening, potato flour, and is fried in vegetable oil.

Applicant's composition comprises high gluten bread flour and yeast. Applicant's method prepares a dough composition, and allows that dough composition to age overnight. Thereafter, Applicant adds the aged, i.e. fermented, dough to freshly-made dough. Applicant's doughnuts comprise about 30-40 weight percent fermented dough and about 60-70 weight percent freshly-made dough. As a result, Applicant's doughnuts comprise a lighter, fluffier, springier, matrix.

As those skilled in the art will appreciate, during fermentation yeast converts complex carbohydrates disposed in the high-gluten flour into simple sugars. That fermentation process releases carbon dioxide. The carbon dioxide gas released is trapped in the tiny air cells in the bread's strong and elastic gluten strands.

When Applicant's dough composition is mixed, gluten fibers cross-bond to form an elastic matrix. The trapped carbon dioxide creates a cellular structure. By using the mixing protocol portion of Applicant's method, and by using fermented dough, Applicant's doughnut comprises a lower bulk density than prior art doughnuts. As a result, Applicant's doughnuts comprise a "fluffier" texture, and further comprise a decreased calorie loading.

TABLE 1

| INGREDIENT | AMOUNT |
|---|---|
| High Gluten Bread Flour | 10 Pounds |
| Enriched Cake Flour - Bleached | 8 Ounces |
| Pastry Flour | 1.5 Pounds |
| Granulated Sugar | 2 Pounds |
| Salt | 4 Ounces |
| Baking Powder | 4 Ounces |
| Potato Flour | 4 Ounces |
| Dry Yeast | 8 ounces |
| Vegetable Shortening | 2 Pounds |
| Water | 1 Gallon |

FIG. 1 summarizes the steps of Applicant's method to prepare his fermented dough. Referring now to FIG. 1, in step 110 the method provides the ingredients in the proportionate amounts recited in Table 1.

In step 120, the method combines the ingredients of step 110 in a mixing vessel. In step 130, the method mixes the ingredients of step 110 for one minute using a first mixing speed. In step 140, the method then mixes the dough composition for ten minutes at a second mixing speed. In step 150, the method then mixes the dough composition at a third mixing speed. In step 160, the method allows the dough to age for at least 18 hours to prepare properly fermented dough.

The following example is presented to further illustrate to persons skilled in the art how to make and use Applicant's fermented dough composition. These examples are not intended as a limitation, however, upon the scope of the invention.

EXAMPLE

The ingredients of step 110 are combined in step 120 in the proportionate amounts recited in Table 1 in a 30 quart stainless steel vessel. In step 130 the dough composition is mixed at about 100 rpm for one minute. In step 140, the dough composition is mixed at about 300 rpm for ten minutes. In step 150, the dough composition is mixed at about 200 rpm for two minutes.

The mixing speeds and times are crucial to preparing a proper fermented dough. Applicant has found that over-mixing results in a weakened gluten matrix leading to insufficient air cell formation, and a dense doughnut product. On the other hand, under-mixing results in an uneven distribution of air cells, and an inconsistent doughnut product.

Figure 2:
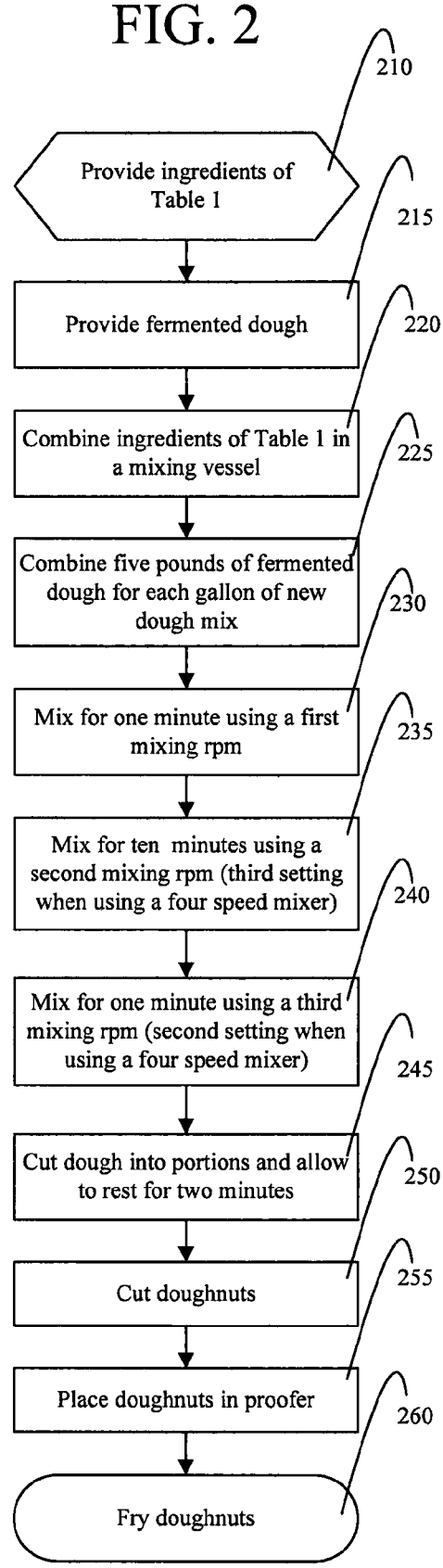
FIG. 2 is a flow chart summarizing the steps of Applicants' method to prepare donuts using the fermented dough of FIG. 1.

FIG. 2 summarizes Applicant's method to prepare doughnuts using the composition of Table 1 in combination with Applicant's fermented dough of step 160. Referring now to FIG. 2, in step 210 the method provides the ingredients in the proportionate amounts recited in Table 1.

In step 215, the method provides the fermented dough of step 160 (FIG. 1). In step 220, the method combines the ingredients of step 210 in a mixing vessel. In step 225, the method combines the fermented dough provided in step 220 with the mixed ingredients of step 220.

In step 230, the method mixes the ingredients of step 210 and fermented dough of step 215 for one minute using a first mixing speed. In certain embodiments, that first mixing speed is about 100 rpm.

In step 235, the method then mixes the dough composition for ten minutes at a second mixing speed. In certain embodiments, that second mixing speed is about 300 rpm. In step 240, the method then mixes the dough composition at a third mixing speed. In certain embodiments, that third mixing speed is about 200 rpm.

In step 245, the method cuts the dough into portions, and allows those portions to rest for about two minutes. In step 250, the method cuts doughnuts from the rested portions of step 245.

In step 255, the method places the doughnuts of step 250 into a steamer/vaporizer unit (proofer unit). In step 260, the method submerges the doughnuts for about 25-35 seconds in a bath of vegetable oil heated to about 375° F.

While the preferred embodiments of the present invention have been illustrated in detail, it should be apparent that modifications and adaptations to those embodiments may occur to one skilled in the art without departing from the scope of the present invention.

We claim:

1. A method to prepare vegetable formulation donuts, comprising:
    preparing a first batch of donut dough comprising 16 weight percent granulated sugar based upon a weight of flour utilized, wherein said first batch of donut dough comprises no butter, no milk products, and no eggs;
    allowing said first batch of donut dough to age for at least 24 hours to prepare fermented dough;
    preparing a second batch of donut dough, wherein said second batch of donut dough comprises no butter, no milk products, and no eggs;
    mixing said fermented dough with said second batch of donut dough, wherein said donuts comprise about 30-40 weight percent fermented dough and about 60-70 weight percent second batch dough;
    cutting donuts from said fermented dough/second batch of donut dough mixture; and
    frying said donuts in vegetable oil.

2. The method of claim 1, wherein said preparing a first batch of donut dough comprises combining high gluten bread flour, enriched cake flour—bleached, pastry flour, said granulated sugar, salt, baking powder, potato flour, dry yeast, vegetable shortening, and water.

3. The method of claim 2, wherein said preparing a first batch of donut dough further comprises the following steps in the following order:
    providing a mixer;
    mixing using said mixer at about 100 rpm for about a minute said combination of high gluten bread flour, enriched cake flour—bleached, pastry flour, said granulated sugar, salt, baking powder, potato flour, dry yeast, vegetable shortening, and said water;
    mixing using said mixer at about 300 rpm for about 10 minutes said combination of high gluten bread flour, enriched cake flour—bleached, pastry flour, granulated sugar, salt, baking powder, potato flour, dry yeast, vegetable shortening, and water; and
    mixing using said mixer at about 200 rpm for about 2 minutes said combination of high gluten bread flour, enriched cake flour—bleached, pastry flour, granulated sugar, salt, baking powder, potato flour, dry yeast, vegetable shortening, and water.

4. The method of claim 3, wherein:
    10 pounds of said high gluten bread flour are mixed;
    8 ounces of said enriched cake flour—bleached are mixed;
    1.5 pounds of said pastry flour are mixed;
    2 pounds of said granulated sugar are mixed;
    4 ounces of said salt are mixed;
    4 ounces of said baking powder are mixed;
    4 ounces of said potato flour are mixed;
    8 ounces of said dry yeast are mixed;
    2 pounds of said vegetable shortening are mixed; and
    1 gallon of said water is mixed.

5. The method of claim 1, wherein said preparing a second batch of donut dough comprises combining high gluten bread flour, enriched cake flour—bleached, pastry flour, said granulated sugar, salt, baking powder, potato flour, dry yeast, vegetable shortening, and water.

6. The method of claim 5, wherein said preparing a second batch of donut dough further comprises the following steps in the following order:
    providing a mixer;
    mixing using said mixer at about 100 rpm for about a minute said combination of high gluten bread flour, enriched cake flour—bleached, pastry flour, granulated sugar, salt, baking powder, potato flour, dry yeast, vegetable shortening, and water;
    mixing using said mixer at about 300 rpm for about 10 minutes said combination of high gluten bread flour, enriched cake flour—bleached, pastry flour, granulated sugar, salt, baking powder, potato flour, dry yeast, vegetable shortening, and water; and mixing using said mixer at about 200 rpm for about 2 minutes said combination of high gluten bread flour, enriched cake flour—bleached, pastry flour, granulated sugar, salt, baking powder, potato flour, dry yeast, vegetable shortening, and water.

7. The method of claim 6, further comprising:

cutting said mixture of fermented dough and said second batch of dough into portions; and allowing said portions to rest for about 2 minutes.

8. The method of claim 7, further comprising placing said donuts into a vaporizer after cutting said donuts but before frying said donuts.

9. The method of claim 8, wherein said donuts are fried for about 25-35 seconds in a bath of vegetable oil heated to about 375° F.

10. An edible food product, formed by the process of:

preparing a first batch of donut dough comprising 16 weight percent granulated sugar based upon a weight of flour utilized, wherein said first batch of donut dough comprises no butter, no milk products, and no eggs;

allowing said first batch of donut dough to age for at least 24 hours to prepare fermented dough;

preparing a second batch of donut dough, wherein said second batch of donut dough comprises no butter, no milk products, and no eggs;

mixing said fermented dough with said second batch of donut dough, wherein said donuts comprise about 30-40 weight percent fermented dough and about 60-70 weight percent second batch dough;

cutting donuts from said fermented dough/second batch of donut dough mixture; and frying said donuts in vegetable oil.

11. The edible food product of claim 10, wherein said preparing a first batch of donut dough comprises combining high gluten bread flour, enriched cake flour—bleached, pastry flour, granulated sugar, salt, baking powder, potato flour, dry yeast, vegetable shortening, and water.

12. The edible food product of claim 11, wherein said preparing a first batch of donut dough further comprises the following steps in the following order:

providing a mixer;

mixing using said mixer at about 100 rpm for about a minute said combination of high gluten bread flour, enriched cake flour—bleached, pastry flour, granulated sugar, salt, baking powder, potato flour, dry yeast, vegetable shortening, and water;

mixing using said mixer at about 300 rpm for about 10 minutes said combination of high gluten bread flour, enriched cake flour—bleached, pastry flour, granulated sugar, salt, baking powder, potato flour, dry yeast, vegetable shortening, and water; and mixing using said mixer at about 200 rpm for about 2 minutes said combination of high gluten bread flour, enriched cake flour—bleached, pastry flour, granulated sugar, salt, baking powder, potato flour, dry yeast, vegetable shortening, and water.

13. The edible food product of claim 12, wherein:

10 pounds of said high gluten bread flour are mixed;

8 ounces of said enriched cake flour—bleached are mixed;

1.5 pounds of said pastry flour are mixed;

2 pounds of said granulated sugar are mixed;

4 ounces of said salt are mixed;

4 ounces of said baking powder are mixed;

4 ounces of said potato flour are mixed;

8 ounces of said dry yeast are mixed;

2 pounds of said vegetable shortening are mixed; and 1 gallon of said water is mixed.

14. The edible food product of claim 10, wherein said preparing a second batch of donut dough comprises combining high gluten bread flour, enriched cake flour—bleached, pastry flour, granulated sugar, salt, baking powder, potato flour, dry yeast, vegetable shortening, and water.

15. The edible food product of claim 14, wherein said preparing a second batch of donut dough further comprises the following steps in the following order:

providing a mixer;

mixing using said mixer at about 100 rpm for about a minute said combination of high gluten bread flour, enriched cake flour—bleached, pastry flour, granulated sugar, salt, baking powder, potato flour, dry yeast, vegetable shortening, and water;

mixing using said mixer at about 300 rpm for about 10 minutes said combination of high gluten bread flour, enriched cake flour—bleached, pastry flour, granulated sugar, salt, baking powder, potato flour, dry yeast, vegetable shortening, and water; and mixing using said mixer at about 200 rpm for about 2 minutes said combination of high gluten bread flour, enriched cake flour—bleached, pastry flour, granulated sugar, salt, baking powder, potato flour, dry yeast, vegetable shortening, and water.

16. The edible food product of claim 15, wherein said process further comprises:

cutting said mixture of fermented dough and said second batch of dough into portions; and allowing said portions to rest for about 2 minutes.

17. The edible food product of claim 16, wherein said process further comprises placing said donuts into a vaporizer after cutting said donuts but before frying said donuts.

18. The edible food product of claim 17, wherein said donuts are fried for about 25-35 seconds in a bath of vegetable oil heated to about 375° F.

* * * * *